(12) United States Patent
Aoyagi et al.

(10) Patent No.: US 9,144,021 B2
(45) Date of Patent: Sep. 22, 2015

(54) MOBILE COMMUNICATION SYSTEM, CONTROLLER AND METHOD

(75) Inventors: Kenichiro Aoyagi, Yokosuka (JP);
Yasuhiro Kawabe, Yokosuka (JP);
Yuichiro Nakamura, Zushi (JP);
Hideyuki Matsutani, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 293 days.

(21) Appl. No.: 13/640,686

(22) PCT Filed: Apr. 12, 2011

(86) PCT No.: PCT/JP2011/059108
§ 371 (c)(1),
(2), (4) Date: Oct. 11, 2012

(87) PCT Pub. No.: WO2011/129343
PCT Pub. Date: Oct. 20, 2011

(65) Prior Publication Data
US 2013/0051227 A1 Feb. 28, 2013

(30) Foreign Application Priority Data

Apr. 15, 2010 (JP) .................................. 2010-094304

(51) Int. Cl.
*G08C 17/00* (2006.01)
*H04W 52/02* (2009.01)
(52) U.S. Cl.
CPC ............ *H04W 52/0248* (2013.01); *Y02B 60/50* (2013.01)
(58) Field of Classification Search
USPC .................. 370/310–350, 431–444
See application file for complete search history.

(56) References Cited

U.S. PATENT DOCUMENTS

| 8,351,358 B2 * | 1/2013 | Ketheesan et al. ............ 370/310 |
| 2004/0017795 A1 | 1/2004 | Abraham et al. |
| 2004/0254980 A1 * | 12/2004 | Motegi et al. ................. 709/203 |
| 2005/0237935 A1 * | 10/2005 | Chae et al. .................... 370/232 |
| 2006/0052137 A1 * | 3/2006 | Randall et al. ................ 455/560 |
| 2008/0076442 A1 * | 3/2008 | Ishii et al. ..................... 455/453 |
| 2010/0144363 A1 * | 6/2010 | De Rosa et al. ............ 455/452.1 |

FOREIGN PATENT DOCUMENTS

| EP | 2 061 192 A1 | 5/2009 |
| EP | 2 320 692 A1 | 5/2011 |
| JP | 2009-130780 A | 6/2009 |

(Continued)

OTHER PUBLICATIONS

International Search Report w/translation from PCT/JP2011/059108 mailed on May 24, 2011 (4 pages).

(Continued)

*Primary Examiner* — Kwang B Yao
*Assistant Examiner* — Juvena Loo
(74) *Attorney, Agent, or Firm* — Osha Liang LLP

(57) ABSTRACT

A controller in a mobile communication system includes a management unit (151) configured to manage a resource usage condition in the mobile communication system and a determination unit (152) configured to determine to which an idle state or a power saving state different from the idle state a user equipment (10) is to transition after completion of communication of a data signal depending on the resource usage condition, and the state determined by the determination unit (152) is indicated to the user equipment (10).

12 Claims, 7 Drawing Sheets

(56) References Cited

FOREIGN PATENT DOCUMENTS

| WO | 2009/062304 A1 | 5/2009 |
|---|---|---|
| WO | 2010/025665 A1 | 3/2010 |

OTHER PUBLICATIONS

Written Opinion of the International Searching Authority from PCT/JP2011/059108 mailed on May 24, 2011 (4 pages).

3GPP TS 25.331 V8.6.0; "3rd Generation Partnership Project; Technical Specification Group Radio Access Network; Radio Resource Control (RRC); Protocol Specification (Release 8)"; Mar. 2009 (1673 pages).

Extended European Search Report for corresponding European Application No. 11768864.8, mailed Dec. 10, 2013 (9 pages).

Office Action issued in corresponding Chinese Application No. 201180028917.7, mailed Oct. 27, 2014 (15 pages).

Office Action in counterpart Chinese Patent Application No. 201180028917.7, mailed Jun. 3, 2015 (13 pages).

* cited by examiner

FIG.2

| RNC15 | |
|---|---|
| THE NUMBER OF CONNECTING USERS | |
| Iu USAGE RATE | |
| Iub#1 USAGE RATE | |
| Iub#2 USAGE RATE | |
| Iub#3 USAGE RATE | |
| FACH USAGE RATE | |

FIG.3

| SWITCHING APPARATUS 17 | |
|---|---|
| THE NUMBER OF ATTACHES | |

| RNC16 | |
|---|---|
| THE NUMBER OF CONNECTING USERS | |
| Iur USAGE RATE | |

| BTS#1(11) | |
|---|---|
| THE NUMBER OF USED BB CARDS | |
| TRANSMIT POWER | |

| BTS#2(12) | |
|---|---|
| THE NUMBER OF USED BB CARDS | |
| TRANSMIT POWER | |

| BTS#3(13) | |
|---|---|
| THE NUMBER OF USED BB CARDS | |
| TRANSMIT POWER | |

MOBILE COMMUNICATION SYSTEM, CONTROLLER AND METHOD

TECHNICAL FIELD

The disclosed invention relates to a mobile communication system, a controller and a method.

BACKGROUND ART

A mobile apparatus in a mobile communication system transitions to some power saving states (Battery Efficient states) after completion of transmission and reception of data signals in order to reduce battery power consumption. Operating states of the mobile apparatus are managed by a controller (for example, a radio network controller (RNC) in a W-CDMA system). When the mobile apparatus changes the operating state, the mobile apparatus has to receive an indication for it from the controller. After completion of transmission and reception in a dedicated channel (DCH), the mobile apparatus transmits a state transition request signal to request transition to a power saving state. In the W-CDMA system, the state transition request signal is referred to as an RRC SIGNALING CONNECTION RELEASE INDICATION. The mobile apparatus can transition to the power saving state by receiving an indication from the controller or a network (NW). The power saving state is an idle state, a PCH state (Cell_PCH/URA_PCH), a FACH (Forward Access Channel) state for use of a FACH and so on. In the mobile communication system, a function to enable the mobile apparatus to transition to any of the power saving states after releasing the dedicated channel (DCH) to save battery energy in the mobile apparatus is called a Fast Dormancy function. See 3GPP TS25.331 v8.6.0 for the function, for example.

SUMMARY OF INVENTION

Problem to be Solved by the Invention

In the idle state, the mobile apparatus releases a dedicated channel and operates in the state having the most power saving effect. Accordingly, it will take a relatively long time for the mobile apparatus to transition from the idle state to a state where the mobile apparatus can communicate in a dedicated channel (DCH). On the other hand, in the cases of the PCH state (Cell_PCH/URA_PCH) and the FACH state (Cell_FACH), the mobile apparatus can relatively rapidly transition to the state where the mobile apparatus can communicate in the dedicated channel (DCH). However, the PCH state (Cell_PCH/URA_PCH) and the FACH state (Cell_FACH) may consume more network resources than the idle state does. Thus, it is not preferred that the mobile apparatus transitions to power saving states other than the idle state if the network resources are tight.

One object of the disclosed invention is to enable a user equipment to transition to any appropriate one of multiple power saving states after completion of transmission and reception of data signals.

Means for Solving the Problem

One aspect of the disclosed invention relates to a controller in a mobile communication system including a management unit configured to manage a resource usage condition in the mobile communication system and a determination unit configured to determine to which an idle state or a power saving state different from the idle state a user equipment is to transition after completion of communication of a data signal depending on the resource usage condition, wherein the state determined by the determination unit is indicated to the user equipment.

Advantage of the Invention

According to the disclosed invention, a user apparatus can transition to any appropriate one of multiple power saving states after completion of transmission and reception of data signals.

BRIEF DESCRIPTION OF DRAWINGS

FIG. 2 illustrates an exemplary table used to manage a resource usage condition;
FIG. 3 illustrates exemplary tables used to manage a resource usage condition.

EMBODIMENTS FOR CARRYING OUT THE INVENTION

Embodiments for carrying out the present invention are described below with reference to the drawings. Note that the same reference symbols are used for elements having the same functions throughout all the drawings for illustrating the embodiments and duplicated descriptions are omitted.

[System Arrangement]

Figure 1:
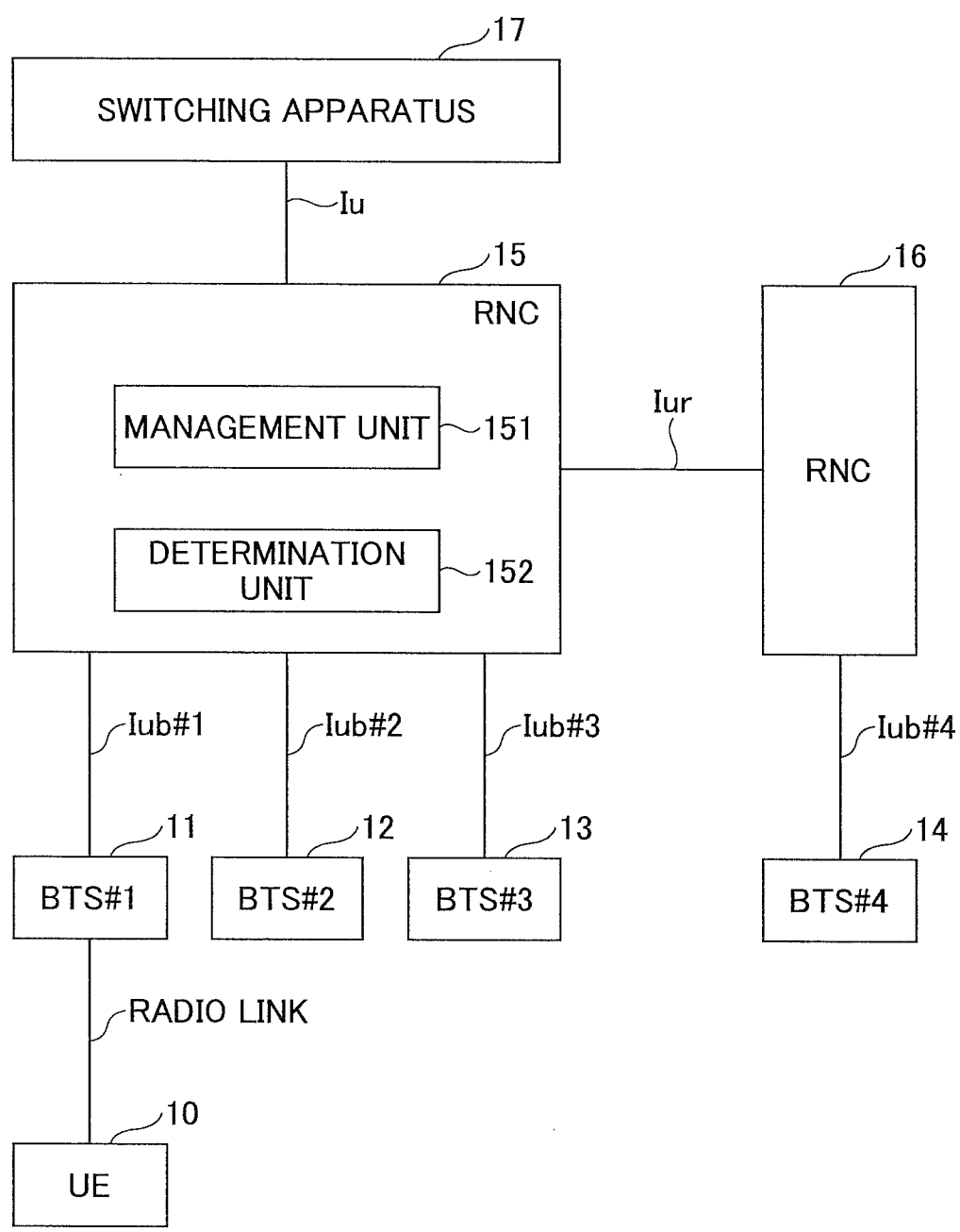
FIG. 1 illustrates a system arrangement.

FIG. 1 illustrates a mobile communication system according to one embodiment. The mobile communication system includes a mobile apparatus (UE) 10, base stations (BTS#1-4) 11-14, radio network controllers (RNCs) 15, 16 and a switching apparatus 17, which are connected as illustrated.

The mobile apparatus (UE) 10 is any apparatus wirelessly communicating with a base station. For convenience of explanation, the mobile apparatus is used, although a fixed terminal may be used. More generally, any appropriate user equipment communicating with the base station may be used. The user equipment may be, but is not limited to, a cellular phone, an information terminal, a personal digital assistant, a handheld personal computer and so on. The mobile apparatus (UE) 10 can communicate in a dedicated channel (DCH) and also operate in a power saving state in accordance with an indication from a controller such as the RNC. The power saving state is an idle state, a PCH state (Cell_PCH/URA_PCH), a FACH state using a forward access channel (FACH) or others. Alternatively, the power saving state may be defined as a state where control information is received only in discontinuous reception (DRX) cycles. In this case, there may be multiple power saving states having different DRX cycles. The mobile apparatus (UE) 10 transitions to any of the power saving states depending on indications from the controller after releasing the dedicated channel (DCH) in order to save battery energy of the mobile apparatus.

Each of the base stations (BTS#1-4) 11-14 transmits downlink radio signals and receives uplink radio signals over radio links to/from the mobile apparatuses (UE) 10 residing in respective cells. Further, the base stations (BTS#1-4) 11-14 transmit and receive downlink signals and uplink signals to/from the mobile apparatuses (UE) 10 under control by the radio network controller (RNC). Particularly in this embodiment, the base station receives a state transition request signal (RRC SIGNALING CONNECTION RELEASE INDICATION) from the mobile apparatus (UE) 10 and transmits it to the radio network controller (RNC). Then, the base station receives a state transition indication signal from the radio network controller (RNC) and transmits it to the mobile apparatus (UE) 10.

The radio network controllers (RNCs) 15 and 16 are connected to one or more base stations over inter-device interfaces Iubs#1-4 and control radio communications of the mobile apparatuses 10. The radio network controllers (RNC) 15 and 16 are connected via an inter-device interface Iur and exchange data signals and control signals. Particularly in this embodiment, the radio network controller (RNC) receives a state transition request signal from the mobile apparatus (UE) via the base stations. The radio network controller (RNC) determines to which state the mobile apparatus (UE) 10 is to transition and informs the mobile apparatus (UE) 10 of the determined state (via the base stations). The radio network controller (RNC) is described in detail below.

The switching apparatus 17 is connected to the radio network controller (RNC) 15 via an inter-device interface Iu. Although the illustrated radio network controller 16 is also connected to any switching apparatus, that switching apparatus may be the switching apparatus 17 as illustrated or any other non-illustrated switching apparatus. The switching apparatus 17 performs operations in a core network in the mobile communication system, for example, management of subscriber information, mobility management, control of incoming and outgoing calls, charge control and QoS control. Thus, the switching apparatus 17 may be an element serving as a Serving GPRS Support Node (SGSN), a Gateway GPRS Support Node (SGSN) and/or a Mobility Management Entity (MME).

Note that the mobile communication system may include an arbitrary number of mobile apparatuses (UEs) 10, an arbitrary number of base stations 11-14, an arbitrary number of radio network controllers (RNCs) 15, 16 and an arbitrary number of switching apparatuses 17.

[Radio Network Controller]

As illustrated in FIG. 1, the radio network controller (RNC) 15 includes a management unit 151 and a determination unit 152. Although the radio network controller 16 also has similar functional elements, they are omitted for illustrative clarification.

The management unit 151 manages a resource usage condition in the mobile communication system. The resource usage condition may be represented by conditions as follows, for example, but is not limited to them.

Congestion condition of radio network controller (RNC) 15

This can be represented by the number of users connected to the radio network controllers (RNCs) 15, a usage condition of wired link resources, a usage rate of a forward access channel (FACH) and so on. The usage condition of wired link resources can be represented by usage conditions or usage rates of the inter-device interfaces Iu, Iur and/or Iub.

Congestion condition of other apparatuses connected to radio network controller (RNC) 15

In the embodiment illustrated in FIG. 1, other apparatuses may be the base stations 11-13, the switching apparatus 17 and the radio network controller (RNC) 16 and may further include the base station 14.

The congestion condition of the base stations 11-13 can be represented by a usage condition of radio resources used by the respective base stations 11-13. For example, the congestion condition of the base stations 11-13 may be represented by the number of mobile apparatuses accessing the respective base stations 11-13, power usage conditions of the respective base stations and so on. For example, the number of accessing mobile apparatuses can be represented by the number of used baseband cards (BB). The power usage condition can be represented by what proportion of the maximum transmit power available to the base stations is used and so on. Further, a radio access restriction condition may be taken into account to determine the congestion condition of the base stations. The restriction condition can be represented by what percentage of radio accesses are currently restricted and so on.

The congestion condition of the switching apparatus 17 can be represented by the number of users (the number of attaches) subjected to mobility management by the switching apparatus 17. The information can be obtained via the inter-device interface Iu.

The congestion condition of the radio network controller (RNC) 16 can be represented by the number of users connected to the radio network controller (RNC) 16, a usage condition of the inter-device interface Iur and so on. The information can be obtained via the inter-device interface Iur.

Similar to the base stations 11-13, the congestion condition of the base station 14 can be also represented by the radio resource usage condition and can be also represented by the number of mobile apparatuses accessing the base station 14, a power usage condition of the base station and so on. The information can be obtained via the inter-device interfaces Iub and Iur. Further, the radio access restriction condition may be taken into account to determine the congestion condition of the base station. The restriction condition can be represented by what percentage of the radio accesses are currently restricted.

FIG. 2 illustrates an exemplary table for managing wired link resources and a FACH usage rate. This relates to the congestion condition of the radio network controller (RNC) 15.

FIG. 3 illustrates exemplary tables for managing the congestion conditions of the switching apparatus 17, the radio network controller (RNC) 16 and the base stations 11-13. These relate to the congestion conditions of other apparatuses connected to the radio network controller (RNC) 15.

The determination unit 152 in FIG. 1 determines to which power saving state a user equipment is to transition after completion of communication of data signals based on resource usage conditions managed by the management unit 151. In general, if the amount of used resources is more than or equal to a predefined threshold (if less resources are unused), the target state of the transitioning mobile apparatus is set to the idle state, and otherwise (if more resources are unused), the target state is set to a power saving state different from the idle state. Also, the target state of the transitioning mobile apparatus may be determined in consideration of restriction conditions of individual cells as well as the magnitude of the amount of used resources. For example, if a predefined percentage or a higher percentage of radio accesses are restricted, for example, if 70% of radio accesses are restricted in a camped cell of the mobile apparatus (UE) 10, the target state of the mobile apparatus (UE) 10 after communication is determined as the idle state. On the other hand, if a lower percentage of radio accesses are restricted, the target state of the mobile apparatus (UE) after communication is determined as a power saving state different from the idle state.

Figure 4A:
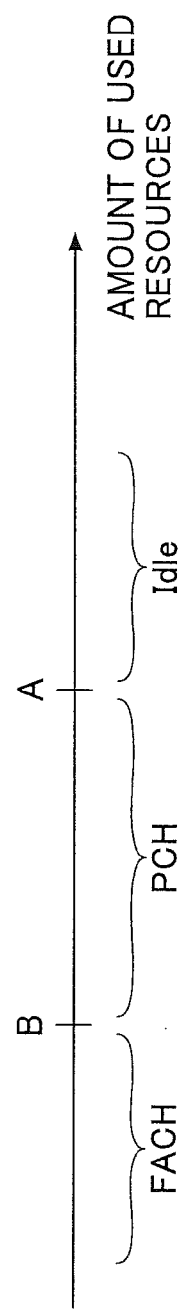
FIG. 4A illustrates a relationship between amounts of used resources and target states.

The power saving states other than the idle state are the PCH state (Cell_PCH/URA_PCH) and the FACH state (Cell_FACH) as stated above. In order to identify the multiple power saving states uniquely, multiple thresholds may be set. For example, the target state of the transitioning mobile apparatus may be determined in a manner as illustrated in FIG. 4A. If the amount of used resources exceeds a first threshold A, the target state of the mobile apparatus is determined as the idle state. If the amount of used resources is smaller than the first threshold A and is more than or equal to a second threshold B, the target state of the mobile apparatus is determined as the PCH state. If the amount of used resources is smaller than the second threshold B, the target state of the mobile apparatus is determined as the FACH state. As stated above, the power saving state may be defined as a state where control information is received only in discontinuous reception (DRX) cycles, and multiple power saving states having different DRX cycles may be provided. For example, states of DRX cycles T1, T2 and T3 (where T1>T2>T3) may be used instead of the idle state, the PCH state and the FACH state.

The "amount of used resources" serving as determination criteria for the determination unit 152 is determined based on one or more of the congestion conditions as illustrated in FIGS. 2-3. For example, individual items of the number of users connected to the RNC 15, the usage rates of the inter-device interfaces Iub#1-3 and the FACH usage rate are compared with respective thresholds, and the target state of the mobile apparatus may be determined based on the comparison. For example, the target state of the mobile apparatus may be determined depending on whether any of the items exceeds the respective threshold. The target state determined by the determination unit 152 is indicated to the mobile apparatus via the base station.

The determination unit 152 may or may not permit the state transition. In the case where the state transition is not permitted, the target state is not indicated. In this case, the mobile apparatus (UE) 10 can retransmit a state transition request signal after passage of a predefined time period to request availability determination of the state transition again.

If the idle state is determined as the target state, the determination unit 152 may set a cell of a different frequency (different frequency cell) or a cell of a different radio access technology (different RAT cell) as a standby cell of the mobile apparatus (UE) 10. If the different frequency cell or the different RAT cell is less congested than the camped cell, load distribution in the mobile communication system can be achieved by guiding the mobile apparatus (UE) 10 to a vacant cell.

[Exemplary Operations]

Figure 5:
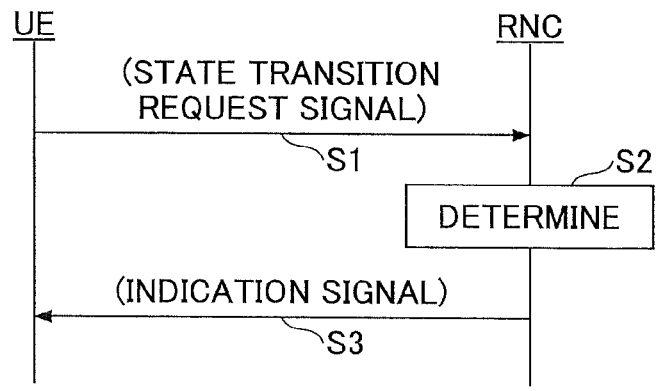
FIG. 5 is a sequence diagram illustrating exemplary operations.

FIG. 5 illustrates exemplary operations performed between the mobile apparatus (UE) 10 and the radio network controller (RNC) 15. Although these operations are conducted via the base station (BTS#1), the base station (BTS#1) is not illustrated for illustrative simplicity.

At step S1, upon completion of transmission and reception of data signals in a dedicated channel (DCH), the mobile apparatus (UE) 10 transmits a state transition request signal to the radio network controller (RNC) 15 to transition to a power saving state. For example, an upper application of the mobile apparatus (UE) 10 detects that there is no data to be communicated and notifies a RRC layer of it. In response to the notification, the RRC layer transmits the state transition request signal.

At step S2, in response to receipt of the state transition request signal from the mobile apparatus (UE) 10, the radio network controller (RNC) 15 determines to which power saving state the mobile apparatus (UE) 10 is to transition. The determination is made by the above-stated determination unit 152.

At step S3, the determined target state is indicated by the radio network controller (RNC) 15 to the mobile apparatus (UE) 10 via the base station (BTS#1). Subsequently, the mobile apparatus (UE) 10 transitions to the state indicated by the radio network controller (RNC) 15.

Note that the determination unit 152 in the radio network controller (RNC) 15 may or may not permit the state transition. If the determination unit 152 does not permit the state transition, the indication signal is not transmitted at step S3. In this case, the mobile apparatus (UE) 10 retransmits the state transition request signal after passage of a predefined time period (for example, after five seconds) to request availability determination of the state transition.

[First Variation]

In the example illustrated in FIG. 1, the management unit 151 for managing the resource usage condition and the determination unit 152 for determining the target state are provided in the radio network controller (RNC), but this is not essential. These functional elements may be provided in another apparatus or entity.

Figure 6:
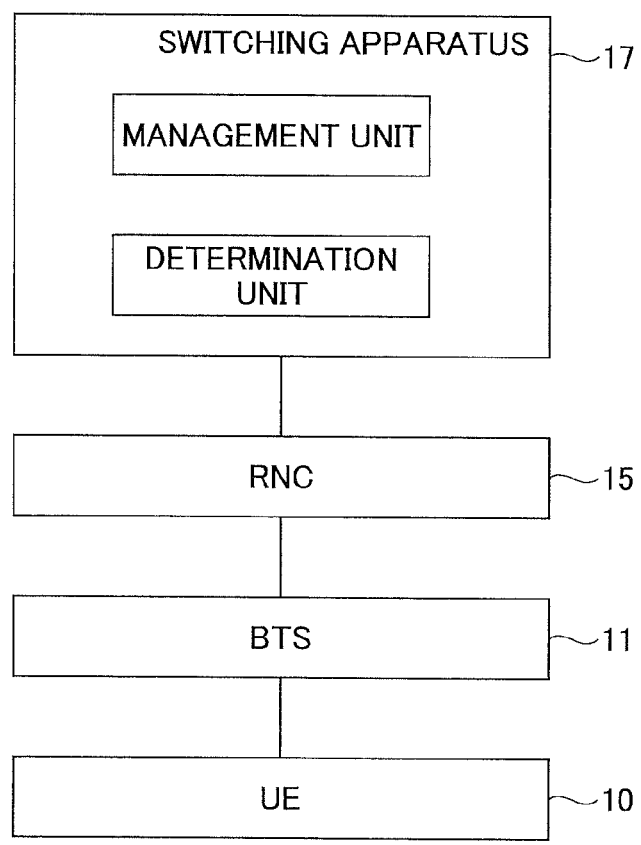
FIG. 6 illustrates an exemplary variation.
Figure 7:
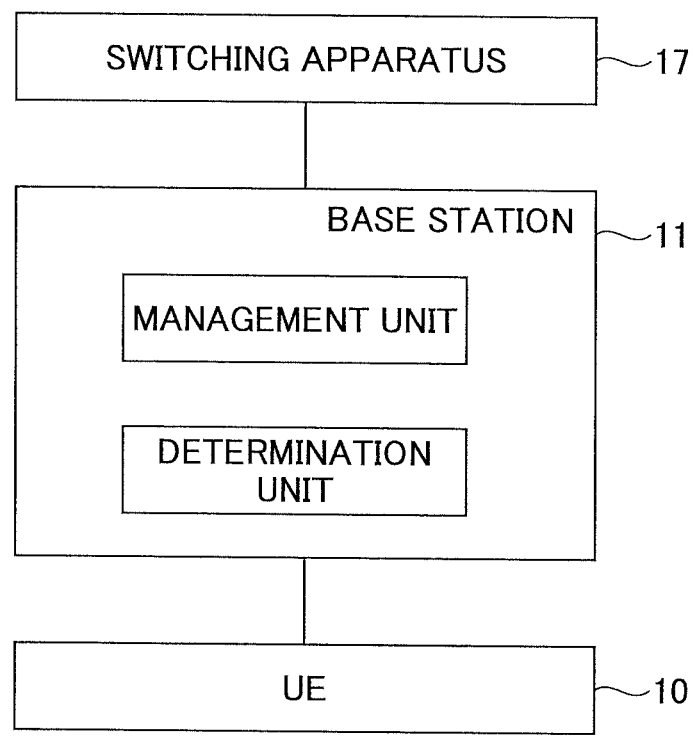
FIG. 7 illustrates an exemplary variation.

FIG. 6 illustrates that the management unit and the determination unit are provided in the switching apparatus 17. In this case, the switching apparatus 17 performs operations of the management unit 151 and the determination unit 152. FIG. 7 illustrates that the management unit and the determination unit are provided in the base station 11. In this case, the base station 11 performs operations of the management unit 151 and the determination unit 152. The embodiment as illustrated in FIG. 7 may be suitable for a system using a femto base station and an LTE (Long Term Evolution) based mobile communication system.

In the above examples, both the management unit and the determination unit are provided in the same functional entity (the switching apparatus, the radio network controller or the base station), but the management unit and the determination unit may be provided in separate functional elements. Further, the operations performed by the management unit may be conducted by two or more of the base station, the radio network controller and the switching apparatus. The operations performed by the determination unit may be conducted by two or more of the base station, the radio network controller and the switching apparatus.

[Second Variation]

As stated above, the determination unit 152 may or may not permit the state transition for the state transition request signal from the mobile apparatus. If the determination unit 152 does not permit the state transition, the target state is not indicated. In this case, the mobile apparatus (UE) 10 can retransmit the state transition request signal after passage of a predetermined time period to request the availability determination of the state transition. The shorter time period can allow the mobile apparatus to rapidly transition to the power saving state. However, if the mobile apparatus frequently transmits some signals, in addition to radio resources for the transmissions, frequent operations in the base station and the controller are needed. Such frequent or excessive transmissions of the state transition request signal by the mobile apparatus are not preferable from the viewpoint of network management or others. From this viewpoint, the second variation of the present embodiment controls the above predefined time period (which is set as a timer value) dynamically depending on the resource usage condition.

In general, if the amount of used resources is more than or equal to a predefined threshold (if less resources are unused), the timer value is set to a greater or longer value (for example, five seconds), and otherwise (if more resources are unused), the timer value is set to a smaller or shorter value (for example, one second). Also, the target state of the mobile apparatus may be determined in consideration of not only the amount of used resources but also the restriction conditions in individual cells. For example, if higher than or equal to a predefined percentage of radio accesses are restricted, for example, if 70% of radio accesses are restricted in a camped cell of the mobile apparatus (UE) 10, the timer value is set to a greater or longer value. On the other hand, if a lower percentage of radio accesses are restricted, the timer value is set to a smaller or shorter value. The determined timer value is broadcast to mobile apparatuses as broadcast information, for example.

Figure 4B:
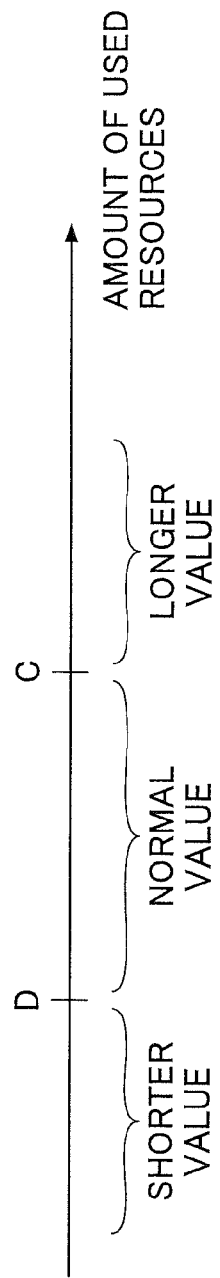
FIG. 4B illustrates a relationship between amounts of used resources and timer values.

The timer value may be set to different values (for example, 5 seconds, 3 seconds, 1 second and so on) depending on situations. In order to identify these values uniquely, multiple thresholds may be set. For example, the timer value may be set in a manner as illustrated in FIG. 4B. If the amount of used resources exceeds a third threshold C, the timer value is set to a value greater or longer than a normal value. If the amount of used resources is less than the third threshold C and are greater than or equal to a fourth threshold D, the timer value is set to the normal value. If the amount of used resources is less than the fourth threshold D, the timer value is set to a value smaller or shorter than the normal value. As one example, the greater value, the normal value and the smaller value may be set to five seconds, three seconds and one second, respectively. However, they may be set to any appropriate values.

Further, the control of the state transition of the mobile apparatus and the control of the timer value are applied together. For example, if the amount of used resources is more than or equal to a predefined threshold (if less resources are unused), the target state of the mobile apparatus is set to the idle state, and the timer value is set to the greater value. Otherwise (if more resources are unused), the target state of the mobile apparatus is set to a power saving state different from the idle state, and the timer value is set to the smaller value. Further, different timer values may be determined for different cases where the target state of the mobile apparatus is the idle state, the PCH state or the FACH state. This corresponds to the case where the first threshold A and the third threshold C are set to be equal and the second threshold B and the fourth threshold D are set to be equal. The thresholds A, B, C and D may be set to be different from each other.

It is preferable to control the target state of the mobile apparatus in that the mobile apparatus can reduce power consumption in suitable states. It is preferable to control the timer value from the viewpoint of avoidance of unnecessary usage of network resources. It is advantageous to both the mobile apparatus and the network to control both the target state of the mobile apparatus and the timer value. In addition, control of both the transition target and the timer value is based on the resource usage condition, and accordingly they can be efficiently implemented.

According to the above embodiments, the target state of a transitioning mobile apparatus is determined based on determination of the congestion condition of network (NW) resources, the restriction condition, predefined usage rates of NW resources and so on in implementing the Fast Dormancy function for transitioning the mobile apparatus to power saving states. As a result, it is possible to utilize the NW resources efficiently and determine an appropriate one of the power saving states (UE Battery Efficient states) depending on the congestion condition of network apparatuses and the restriction condition, which can advantageously reduce battery power consumption of the mobile apparatus and shorten connection time under congestion environments.

A mobile communication system according to one aspect of the disclosed invention, in response to receiving a predefined signal from a mobile apparatus, refers to the usage rate of managed NW resources and determines the target state of the mobile apparatus in accordance with a predefined logic to specify the transition of the mobile apparatus to battery power saving states. In this case, the mobile communication system may receive the predefined signal from the mobile apparatus and determine the target state of the mobile apparatus in accordance with the predefined logic with reference to at least one of a resource usage rate of a controller, resource usage rates of links between the controller and other controllers connected to the controller and usage rates of the other controllers. The resource condition management and the determination of the target state may be made in a radio controller, a radio base station apparatus and/or a switching apparatus.

A mobile communication system according to one aspect of the disclosed invention, in response to receiving a predefined signal from a mobile apparatus, refers to a managed restriction condition and determines the target state of the mobile apparatus in accordance with a predefined logic to specify the transition of the mobile apparatus to battery saving states. In this case, the mobile communication system receives the predefined signal from the mobile apparatus and determines the target state of the mobile apparatus in accordance with the predefined logic with reference to the restriction condition in a controller. The resource condition management and the determination of the target state may be made in a radio controller, a radio base station apparatus and/or a switching apparatus.

In the above mobile communication system, when the mobile apparatus receives an indication to transition to the battery power saving state, the mobile communication system may determine a frequency and a communication system in the transition target in accordance with a predefined logic and indicate them to the mobile apparatus.

The present invention has been described with reference to the specific embodiments, but the embodiments are simply illustrative and variations, modifications, alterations and substitutions could be contrived by those skilled in the art. For example, the embodiments may be applied to any appropriate mobile communication system where a mobile apparatus can transition to any of multiple power saving states. For example, the present invention may be applied to a W-CDMA system, a HSDPA/HSUPA W-CDMA system, an LTE system, an LTE-Advanced system, an IMT-Advanced system, a WiMAX system, a Wi-Fi system and so on. In the above description, some specific numerical values are used for better understanding of the present invention. Unless specifically indicated, however, these numerical values are simply illustrative and any other suitable values may be used. Separation of the embodiments or items are not essential to the present invention, and two or more embodiments or items may be combined as needed. Alternatively, an item may be applied to another item (if not inconsistent). For convenience of explanation, apparatuses according to the embodiments have been described with reference to functional block diagrams, but these apparatuses may be implemented in hardware, software or combinations thereof. The software may be stored in any appropriate storage medium such as a RAM (Random Access Memory), a flash memory, a ROM (Read-Only Memory), an EPROM, an EEPROM, a register, a hard disk drive (HDD), a removable disk, a CD-ROM, a database and a server. The present invention is not limited to the above embodiments, and variations, modifications, alterations and substitutions can be made by those skilled in the art without deviating from the spirit of the present invention.

This international patent application is based on Japanese Priority Application No. 2010-094304 filed on Apr. 15, 2010, the entire contents of which are hereby incorporated by reference.

LIST OF REFERENCE SYMBOLS

10: mobile apparatus (UE)
11-14: base station (BTS#1-4)
15, 16: radio network controller (RNC)
17: switching apparatus
151: management unit
152: determination unit

The invention claimed is:

1. A controller in a mobile communication system, comprising:
    a management unit configured to manage a resource usage condition determined based on at least one of a number of users connected to the mobile communication system, a usage condition of wired link resources, a congestion condition in wired signal processing, a usage condition of radio resources, and a cell restriction condition; and
    a determination unit configured to determine to which an idle state or a power saving state different from the idle state a user equipment is to transition when a state transition request signal is received from the user equipment upon completion of communication of a data signal depending on the resource usage condition,
    wherein the state determined by the determination unit is indicated to the user equipment,
    wherein if the resource usage condition indicates that resources more than or equal to a first threshold are used in the mobile communication system, the determination unit determines that the user equipment is to transition to an idle state or a state where a discontinuous reception cycle is a predefined first time period, and
    wherein if the resource usage condition indicates that resources less than the first threshold and more than or equal to a second threshold are used in the mobile communication system, the determination unit determines that the user equipment is to transition to one of a Paging Channel (PCH), a URA Paging Channel (URA PCH) or Cell Paging Channel CELL PCH state and a state where the discontinuous reception cycle is a second time period shorter than the first time period.

2. The controller as claimed in claim 1, wherein if the resource usage condition indicates that resources less than the second threshold are used in the mobile communication system, the determination unit determines that the user equipment is to transition to one of a Forward Access Channel (FACH), a Cell Forward Access Channel (CELL FACH) state, and a state where the discontinuous reception cycle is a third time period shorter than the second time period.

3. The controller as claimed in claim 1, wherein the determination unit determines a timer value depending on the resource usage condition, the timer value determining a frequency of transmitting a state transition request signal for causing the user equipment to transition to a power saving state after completion of communication of a data signal, and wherein if the resource usage condition indicates that an amount of used resources is more than or equal to a predefined threshold, the determination unit determines a target state of the user equipment as an idle state and the timer value as a value longer than a predefined value, and if the resource usage condition indicates that the amount of used resources is less than the predefined threshold, the determination unit determines the target state of the user equipment as a power saving state different from the idle state and the timer value as a value shorter than the predefined value.

4. The controller as claimed in claim 1, wherein the determination unit determines a timer value depending on the resource usage condition, the timer value determining a frequency of transmitting a state transition request signal for causing the user equipment to transition to a power saving state after completion of communication of a data signal.

5. The controller as claimed in claim 2, wherein the determination unit determines a timer value depending on the resource usage condition, the timer value determining a frequency of transmitting a state transition request signal for causing the user equipment to transition to a power saving state after completion of communication of a data signal.

6. The controller as claimed in claim 1, wherein the controller is provided in a switching apparatus, a radio network controller for controlling a base station or the base station.

7. The controller as claimed in claim 2, wherein the controller is provided in a switching apparatus, a radio network controller for controlling a base station or the base station.

8. The controller as claimed in claim 3, wherein the controller is provided in a switching apparatus, a radio network controller for controlling a base station or the base station.

9. The controller as claimed in claim 4, wherein the controller is provided in a switching apparatus, a radio network controller for controlling a base station or the base station.

10. The controller as claimed in claim 5, wherein the controller is provided in a switching apparatus, a radio network controller for controlling a base station or the base station.

11. A mobile communication system including at least a controller and a user equipment,
    the controller comprising:
    a management unit configured to manage a resource usage condition determined based on at least one of a number of users connected to the mobile communication system, a usage condition of wired link resources, a congestion condition in wired signal processing, a usage condition of radio resources, and a cell restriction condition; and
    a determination unit configured to determine to which an idle state or a power saving state different from the idle state a user equipment is to transition when a state transition request signal is received from the user equipment upon completion of communication of a data signal depending on the resource usage condition,
    wherein the state determined by the determination unit is indicated to the user equipment,
    wherein if the resource usage condition indicates that resources more than or equal to a first threshold are used in the mobile communication system, the determination unit determines that the user equipment is to transition to an idle state or a state where a discontinuous reception cycle is a predefined first time period, and
    wherein if the resource usage condition indicates that resources less than the first threshold and more than or equal to a second threshold are used in the mobile communication system, the determination unit determines that the user equipment is to transition to one of a Paging Channel (PCH), a URA Paging Channel (URA PCH) or Cell Paging Channel (CELL PCH) state, and a state where the discontinuous reception cycle is a second time period shorter than the first time period.

12. A control method of a controller in a mobile communication system, comprising:
- managing a resource usage condition determined based on at least one of a number of users connected to the mobile communication system, a usage condition of wired link resources, a congestion condition in wired signal processing, a usage condition of radio resources, and a cell restriction condition;
- determining to which an idle state or a power saving state different from the idle state a user equipment is to transition when a state transition request signal is received from the user equipment upon completion of communication of a data signal depending on the resource usage condition; and
- indicating the determined state to the user equipment,
- wherein if the resource usage condition indicates that resources more than or equal to a first threshold are used in the mobile communication system, determining that the user equipment is to transition to an idle state or a state where a discontinuous reception cycle is a predefined first time period, and
- wherein if the resource usage condition indicates that resources less than the first threshold and more than or equal to a second threshold are used in the mobile communication system, determining that the user equipment is to transition to one of a Paging Channel (PCH), a URA Paging Channel (URA PCH) or Cell Paging Channel (CELL PCH) state, and a state where the discontinuous reception cycle is a second time period shorter than the first time period.

* * * * *